April 14, 1959  J. FINAZZO  2,881,789
SAFETY LOCK VALVE FOR FUEL LINE
Filed July 23, 1957

INVENTOR
JOSEPH FINAZZO
By Gravely, Lieder, Woodruff & Wills
ATTORNEYS.

United States Patent Office 2,881,789
Patented Apr. 14, 1959

2,881,789

SAFETY LOCK VALVE FOR FUEL LINE

Joseph Finazzo, St. Louis, Mo.

Application July 23, 1957, Serial No. 673,621

5 Claims. (Cl. 137—354)

This invention relates generally to lock controlled valves and more particularly to a safety lock valve for a motor vehicle fuel line.

A chief concern of the owners of automobiles and other motor vehicles today is the facility which unauthorized persons have in taking and using automobiles regardless of the precautions taken by the owners in locking the doors and ignition by the conventional equipment provided. In the past several devices for shutting off the fuel line have been suggested, but none of them has been entirely satisfactory.

The principal object of the present invention is to provide a safety lock valve for a vehicle fuel line thereby providing control means ancillary to the ignition lock for preventing the unauthorized use or theft of the vehicle. A more specific object is to provide a lockable valve for a fuel line, the valve being mounted so as to prevent the operation thereof without a key or without disassembling the fuel line from the valve.

Another object is to provide a valve for a fuel line assembled on a vehicle between the fuel tank and the fuel pump so that jumpers or other means cannot be employed successfully for starting and continued operation of the vehicle by reason of the limited supply of fuel available.

Still another object is to provide a novel mounting assembly for securing a shut-off valve in the fuel line of a vehicle whereby the valve cannot be removed and turned to open position without disassembling the fuel line connections to the valve.

These and other objects and advantages will become apparent hereinafter.

Briefly, the present invention comprises a safety lock valve for a vehicle fuel line including a valve having a base secured to a vehicle by a screw, inlet and outlet means to the valve one of which extends over the screw in close proximity thereto, a valve plug adapted to be turned between open inlet and outlet connecting position and closed position, and lock means including a key for turning the plug between open and closed positions, the key being removable from the lock when the plug is in closed position.

The invention also consists in the parts and in the combinations and arrangements of parts hereinafter described and claimed. In the accompanying drawing which forms a part of this specification and wherein like numerals refer to like parts wherever they occur:

Figure 1:
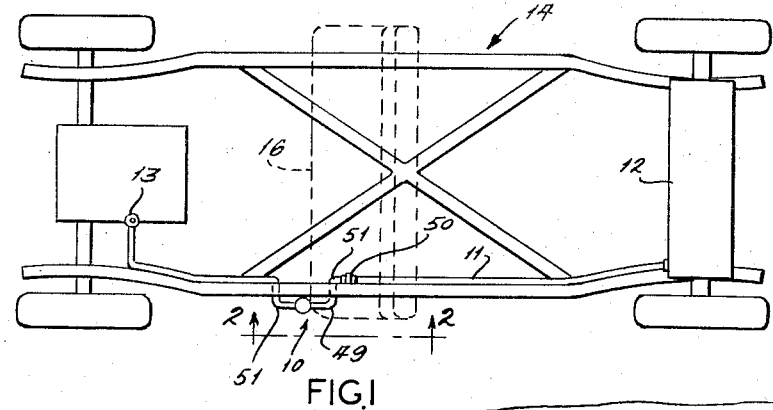
Fig. 1 is a plan view of a vehicle chassis showing a lock valve device embodying the present invention positioned in the fuel line of the vehicle.

Referring now to Fig. 1 of the drawings, the present invention comprises a lock valve device 10 adapted to be mounted in a fuel line 11 extending between the fuel tank 12 and fuel pump 13 of a motor vehicle 14. The lock valve 10 may be interposed in the fuel line 11 and secured to the vehicle frame at any suitable place convenient to the operator of the vehicle 14. Preferably, the lock valve 10 is secured to the floorboard 15 of the vehicle immediately adjacent to the operator's seat 16 (shown in broken lines) so that the lock valve 10 will be readily accessible but not be easily seen.

Briefly, the lock valve 10 includes a lock member 20 which may be of conventional construction and includes a key 21 for turning a latch member 22 between locked and unlocked position. The floorboard 15 of the vehicle is provided with a stepped opening 23 in which the lock is received, the latch member 22 extending through the opening 23 and being positioned beneath the floorboard. The lock 20 includes a cover flange 24 for abutment with the upper surface 25 of the floorboard 15, and a plate 26 seated on the shoulder 27 of the stepped opening 23 is secured to the lock 20 by suitable means such as screws 28. The plate 26 is perforated so that the latch member 22 extends therethrough.

The lock valve 10 also includes a valve member 30 having a base or flanged collar 31 with a threaded central opening 32. The outer flange portion of the collar 31 is provided with openings 33 through which screws 34 or the like extend for securing the collar to the lower surface 35 of the floorboard 15. Preferably, a pair of screw openings 33 are diametrally aligned as will be described hereinafter.

The valve member 30 also comprises a valve body or casing 37 having inlet and outlet port projections comprising threaded nipples 38 and 39, respectively, the nipples being bored at 40 and 41 to provide fuel flow passages through the valve body 37. A vertical or transverse conical bore 42 is also formed in the valve body 37 to accommodate in close fitting relationship therewith a complementary conical valve plug 43. The plug 43 is bored as at 44 to provide direct communication between the inlet and outlet passages 40 and 41 in valve open position but being adapted to be turned transversely of these passages to a valve closed position whereby no fuel will be permitted to flow through the valve member 30.

The upper end of the plug 43 is slotted as at 45 for receiving the latch member 22 of the lock 20 therein, whereby rotation of the plug 43 between open and closed position is controlled by the key 21 and corresponds to the unlocked and locked positions of the key in the lock. The plug 43 is spring-biased in the body in a conventional manner to maintain the plug in close fitting relationship with the valve body 37. A dust cap 46 or the like is provided for protecting the interior of the valve body 37.

Figures 2, 3:
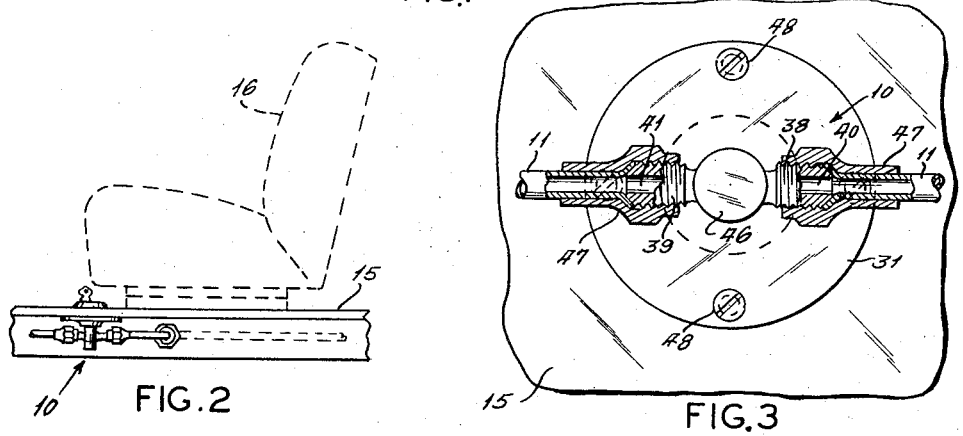
Fig. 2 is an enlarged vertical elevational view taken substantially along line 2—2 of Fig. 1.
Fig. 3 is an enlarged bottom plan view of the lock valve device.
Figures 4, 5:
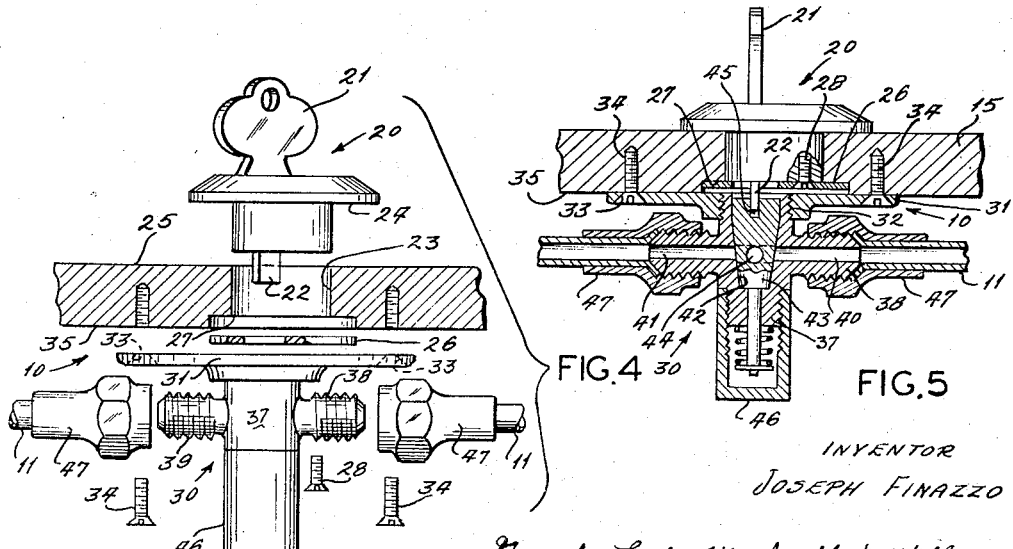
Fig. 4 is an enlarged exploded elevational view of the lock valve device.
Fig. 5 is a vertical cross sectional view of the lock valve device.

As shown in Figs. 3 and 5, the nipples 38 and 39 extend outwardly from the valve body 37 substantially in diametral alignment with the screw openings 33 in the base 31. The nipples 38 and 39 are spaced from or below the openings 33 a distance sufficient to permit the attachment of threaded couplers 47 for attaching the fuel line 11 to the inlet and outlet nipples, and the length of the nipples is predetermined so that the ends thereof do not cover the openings so as to prevent the insertion of the screws 34 therein. However, when the base 31 is secured to the floorboard 15 by the screws 34 and the portions of the fuel line 11 are connected to the nipples 38 and 39 by the couplers 47, the couplers extend over or cover the heads of the screws 34 and are in close proximity thereto for preventing the removal of the screws without first uncoupling the fuel lines 11 from the nipples 38 and 39. Although precise diametral alignment of the nipples 38 and 39 with the openings 33 is not required, it is essential that the axis of the screws 34 intersect the couplers 47 so that the heads of the screws are not accessible. Other screws 48 may also be provided to secure the base 31 to the floorboard 15.

It is now apparent that the present lock valve device 10 provides a safety means for shutting off the fuel lines 11 to the fuel tank 12 whereby automobile theft is prevented. When the valve is shut off there is still sufficient fuel in the pump 13 and carburator (not shown) to start and drive the vehicle 14 a few blocks only. Disassembly of the valve 30 from the floorboard 15 is prevented by the location of the screws 34 under the couplers 47 so that the fuel lines 11 must be disconnected in order to remove the valve 30.

The present lock valve device 10 can be easily installed in existing vehicles 14 by cutting the fuel line and adding an extension line 49 and a union 50 (Fig. 1). The length of the extension line 49 and the number of bends or angles 51 provided in the lines 11 and 49 will depend upon the make and model of the vehicle and the location of the lock device in the operator's compartment.

This disclosure is intended to cover all changes and modifications of the present invention which will be readily apparent to all those skilled in the art, and which do not fall outside the spirit and scope of the invention as defined in the following claims.

I claim:

1. A valve device comprising a valve member having a base secured to a vehicle by a screw, a valve body secured to said base and including inlet and outlet means one of which is aligned with said screw, coupler means attaching a vehicle fuel line to said inlet and outlet means, said coupler means covering said screw to render it inaccessible, without first removing said coupler means, a valve plug movable in said valve body between an inlet and outlet connecting position and a closed position, and means for operating said valve plug.

2. A valve device for the fuel line of a vehicle comprising a base secured to the vehicle by a pair of screws, a valve body secured to said base and having a pair of projections bored to form inlet and outlet means therein, said projections extending from said valve body in spaced aligned relation with said screws, a pair of couplers securing a fuel line to said inlet and outlet projections and covering said screws to prevent the removal of said base from the vehicle without disconnecting said couplers, a valve plug having a passage for connecting said inlet and outlet means in open position and being movable in said valve body to a closed position, and means for operating said valve plug.

3. A safety lock valve device adapted to be interposed in a vehicle fuel line between the fuel tank and fuel pump of the vehicle, said lock valve device comprising a valve member including a base having diametrally aligned openings therein through which a pair of screws are adapted to be received for securing the base to the lower surface of a vehicle floorboard, a valve casing secured to the central portion of said base and having diametrally aligned projections in which inlet and outlet ports are formed, said projections extending outwardly in aligned but spaced relation with the openings in said base, a pair of fuel line connectors connecting fuel lines to said projections in a position in which the axis of said screws intersects the connectors and the connectors are immediately adjacent to said screws to prevent the removal of said screws from said openings without first disconnecting said connectors from said projections, a valve plug having a passage for connecting said inlet and outlet ports in open position and being movable in said casing to a closed position, and lock means including a key for turning said valve plug in said casing.

4. A lock valve device connected in the fuel line of a vehicle having a supporting wall to which said lock valve device is secured, said lock valve device comprising a lock secured on one side of said supporting wall in position to be accessible to an operator of said vehicle, fastening means securing said lock to said supporting wall by being applied from the other side thereof, said lock including a latch member extending through said supporting wall to said other side thereof, and a key for turning said latch member between locked and unlocked positions; and a valve member including a base having a pair of countersunk openings through which a pair of flat-headed screws are received for securing said base to said other side of said supporting wall in fastening means covering position, a valve body secured to said base and a pair of threaded nipples extending radially therefrom, said nipples being bored to form inlet and outlet passages for the valve member, a pair of couplers for securing the fuel line of said vehicle to the nipples of said valve body, said couplers being substantially aligned with the openings in said base whereby the axis of said screws therein intersect said couplers to prevent removal of said screws without first disconnecting said couplers from said nipples, a valve plug having a passage therein adapted to connect said inlet and outlet passages in open position, said valve plug being movable to a closed position, and means connecting said latch member of said lock to said valve plug whereby said key is adapted to turn said valve plug between open and closed positions.

5. A lock valve device for a fuel line of a vehicle, comprising a base having a surface for abutment with the vehicle and an exposed surface with an opening extending between said surfaces, fastening means positioned in said opening for securing said base in abutment with the vehicle, said fastening means being countersunk relative to the exposed surface of the base and being adapted to be removed only by applying to the fastening means a tool extending substantially normal to the exposed surface of the base, a valve body secured to said base and having inlet and outlet means one of which projects toward the opening and is aligned therewith, coupler means for attaching a fuel line to said inlet and outlet means, said coupler means extending over said fastening means in the opening and positioned immediately adjacent to said exposed surface of said base for preventing the application of a tool to the fastening means when said coupling means is assembled on said inlet and outlet means, a valve plug movable in said valve body between an inlet and outlet connecting position and a closed position, and lock means for operating said valve plug.

References Cited in the file of this patent

UNITED STATES PATENTS

| 1,107,800 | Joynes | Aug. 18, 1914 |
| 1,700,474 | Dunn | Jan. 29, 1929 |
| 1,823,006 | Soupal | Sept. 15, 1931 |
| 2,006,027 | Moore | June 25, 1935 |

FOREIGN PATENTS

| 156,427 | Great Britain | Jan. 13, 1921 |